United States Patent [19]
Park

[11] Patent Number: 5,925,850
[45] Date of Patent: Jul. 20, 1999

[54] ELECTRICAL OUTLET, SWITCH AND JUNCTION BOXS

[76] Inventor: Mike K. Park, 14607 Almanac Dr., Burtonsville, Md. 20866

[21] Appl. No.: 09/106,149

[22] Filed: Jun. 29, 1998

Related U.S. Application Data

[63] Continuation-in-part of application No. 08/924,319, Sep. 5, 1997.

[51] Int. Cl.$^6$ ........................................... H02G 3/18
[52] U.S. Cl. ........................... 174/60; 174/59; 174/65 R; 439/721
[58] Field of Search ................................. 174/59, 60, 61, 174/65 R, 84 C; 439/721, 722, 723, 724, 856, 535

[56] References Cited

U.S. PATENT DOCUMENTS

| | | |
|---|---|---|
| 2,451,393 | 10/1948 | Kershaw . |
| 2,463,033 | 3/1949 | Harnett . |
| 2,463,034 | 3/1949 | Harnett . |
| 2,574,608 | 11/1951 | Ziph . |
| 2,824,166 | 2/1958 | Madaras et al. . |
| 2,831,914 | 4/1958 | Jacobs . |
| 2,917,724 | 12/1959 | Jackson . |
| 3,265,807 | 8/1966 | Smith . |
| 3,566,006 | 2/1971 | Metcalf . |
| 3,835,241 | 9/1974 | Masterson et al. . |
| 3,848,224 | 11/1974 | Olivero . |
| 4,019,250 | 4/1977 | Bassett et al. . |
| 4,151,364 | 4/1979 | Ellis . |
| 4,210,772 | 7/1980 | Magana et al. . |
| 4,636,017 | 1/1987 | Boteler . |
| 4,875,957 | 10/1989 | Etheridge . |
| 5,212,346 | 5/1993 | Clark . |
| 5,243,130 | 9/1993 | Kitagawa . |
| 5,471,012 | 11/1995 | Opel . |

*Primary Examiner*—Dean A. Reichard
*Attorney, Agent, or Firm*—James Creighton Wray; Meera P. Narasimhan

[57] ABSTRACT

An electrical box has a base, sidewalls and a cover opposite the base. A mount on the outlet box allows mounting of the outlet box. Plural connector plates within the outlet box separated by plural insulator layers are aligned parallel to the base and the top, and are spaced inward from the walls. A first set of metal conductors extend from the connector plates toward the side walls. A second set of metal conductors extend from the connector plates toward the cover. Two sets of connectors having metal conductive cylinders with inner and outer ends, and having outer insulator cylinders extend axially beyond the metal conductors. Inner ends are attached to the conductors extending from the plates. The insulator cylinders have inner and outer ends. The inner ends of the insulator cylinders extend over the conductors. The outer ends of the insulator are enlarged to receive insulation on connecting wires. A first set of the connectors extends to the sidewalls of the electrical box. A second set of the connectors extends through holes in the connector plates and insulator layers above, toward the cover. Multiple holes are arranged in sets of three in the sidewalls of the outlet box and in the connector plates and insulator layers. Outer ends of the connectors extend to holes in the walls. Uninsulated ends of the short wires are attached to terminals of an outlet and/or switch. Opposite ends of the short wires are attached to conductors by fitting ends of the short wires and their insulation into outer ends of the cylindrical connectors.

14 Claims, 11 Drawing Sheets

ELECTRICAL OUTLET, SWITCH AND JUNCTION BOXS

This application is a continuation-in-part of Ser. No. 08/924,319 filed Sep. 5, 1997 for Easy Junction Box.

BACKGROUND OF THE INVENTION

The present invention relates to electrical switch and outlet boxes.

Existing switch and outlet boxes generally include rectangular or square metal or plastic box-like structures having a removable panel. An open cavity for receiving ends of multi-wire cables is defined by the walls of the structure. Holes are provided in side walls of the structure for receiving the ends of multi-wire cables. Clamps are provided for fixing the cables with respect to the box and for holding ends of the cables in the open cavity of the box-like structure. Insulation surrounding ends of the cables is stripped, thereby exposing the individual wires, which are usually two or three in number, of each cable. Wire connections are formed by joining like wires using wire nuts.

Existing electrical boxes have proven bothersome and difficult to use. Electrical boxes are often positioned in awkward, difficult to reach places in houses and buildings where poor lighting conditions generally exist. To check electrical connections or join additional cables, electricians must remove the screws securing the cover to the box-like structure, tighten or loosen the clamps securing the cables to the box, and bend, pull and twist the wire nuts and wire ends. Wire nuts are unwieldy and must be manipulated along with the wires in the crowded open space of the electrical box prior to reattaching the cover. That manipulation results in loose wire connections and short circuits. Needs exist for electrical boxes that provide for multiple cable attachment without the need for tools, wire nuts, or clamps and without removing electrical box panels.

Potentially fatal situations arise when electricians or homeowners mistakenly cross-connect wires. Needs exist for electrical boxes that minimize the likelihood of such mishaps.

SUMMARY OF THE INVENTION

The present inventions are electrical boxes that attach the ends of multi-conductor cables to switches, outlets or both without the need for clamps, connectors, wire nuts or electrical tape. The box includes a casing having connector plates provided therein. Preferably, three plates are positioned in the casing-one one for the hot line, one for the neutral line and one for the ground. The plates are stacked on top of each other, with layers of electrical insulating material positioned between the plates. The plates may be wires joined in a flat arrangement. Multiple sets of terminals extend from the sides of each plate and upward from each plate. All terminals of a single plate are electrically connected. The terminals are preferably color coded and may have raised letters such that an electrician easily identifies the polarity of each terminal. Openings are provided in sides of the casing for receiving sides of the terminals. Holes are positioned in the connector plates and insulating layers to allow the upward facing terminals to extend beyond the uppermost layer or plate.

In preferred embodiments, the connector plates and the terminals have dimensions and are configured such that they may be easily installed in existing plastic and metal electrical boxes. In one preferred embodiment, the junction box includes a casing having a bottom, four sides, three plates, two or four insulators, and four sets of terminals, with one set of terminals extending through openings in each side of the casing. In another preferred embodiment, each plate carriers eight terminals, such that two sets of terminals extend from each side of the casing.

Each terminal of the electrical box preferably includes an inner clamping part made of a conductive material such as an alloy of copper or nickel, and an outer part made of polypropylene or PVC, or other insulator cover. Each terminal has a generally circular cross-section and includes a large diameter section of the insulator cover extending outward from the casing and a narrow section housed within the casing. The large diameter outward extending cover receives tightly the insulation on the wire which is being attached to the terminal, making two layers of insulation at the connection.

The inner surface of the inner part includes small inward extensions for gripping and holding the wire inserted in the terminal.

The inner parts are inwardly toothed plates rolled into cylinders. The cylinders may be fixed to the connecting plates or wires by soldering, brazing or bonding ends of the cylinders to the plates. Alternatively, short wires may extend from the plates into the cylinders.

In preferred embodiments, the insulator covers of the terminals are color coded, with terminals for receiving hot lines being black, terminals for receiving neutral lines being white, and terminals for receiving ground wires being green. Terminals are positioned on the plates such that when the plates are stacked, the terminals are offset and arranged in sets, with each set including one terminal from each plate.

Rigid or flexible elastomeric cable connectors are included for sealing and preventing access to or contact with the wires and for preventing access to or contact with the wires and for preventing the wires from accidentally releasing from the terminals. Each connector is hollow and has a generally circular cross-section, with its inner cavity gradually decreasing in diameter outwardly from the casing-abutting end. A cable carrying multiple wires proceeds through the cavity. The wires of the cable are individually inserted in appropriate terminals and the connector is urged toward the side of the casing. The connector tightens around the wire and engages the casing for preventing unintended release.

The new junction, outlet or switch box may be used to run additional ground wires in older houses and buildings. Instead of searching for existing junction boxes, the present boxes, including the housed wire connection plates, are installed in convenient locations. Ground wires are run from the breaker switch box to the present junction boxes and then to appropriate outlets.

Wire nuts, clamps, electrical tape and screwdrivers are not needed when connecting wires using the present electrical box. Cable wires are slid into appropriate terminals extending from sides of the box and are secured in the terminals by teeth jutting from the inner linings of the terminals. Outlets and switches are connected by sliding wires attached to the terminals of these components into appropriate terminals extending upward beyond the uppermost conductor plate or insulating layer. A cover plate secures the outlets and switches to the electrical box.

An electrical outlet box has a base and side walls extending from the base. A mount is connected to the outlet box for mounting the outlet box on a structure. Plural conductor plates within the outlet box are separated by plural insulator layers. The plates are aligned generally parallel to the base and the top. The conductor plates are spaced inward from the walls. A first set of metal conductors extends from the conductor plates partially toward the walls. A second set of metal conductors extends normally from the conductor plates toward the top of the box. Two sets of connectors having metal conductive cylinders and having outer insulator cylinders extend axially beyond the metal conductors. The metal conductive cylinders have inner and outer ends. The inner ends are permanently attached to the conductors extending from the plates or are soldered, brazed or welded to the plates. The insulator cylinders have inner and outer ends. The inner ends of the insulator cylinders extend over the metal conductive cylinders The outer ends of the insulator cylinders extend beyond outer ends of the conductive cylinders and are enlarged to receive insulation on the wires extending from the conduits, switches or receptacles.

A first set of the outer ends of the insulator cylinders extend to the side walls of the electrical box. A second set of the outer ends of the insulator cylinders extend through holes in the conductor plates and insulator layers above, toward the top of the box. Multiple holes are arranged in sets of three in the side walls of the outlet box and arranged in sets of three in the conductor plates and insulator layers. The outer ends of the conductive cylinders extend to the holes in the walls or to the holes in the conductor plates or insulator layers.

Outlets are attached by short wires slid into the terminals. Insulation is removed from both ends of the short electrical wires. The inner ends of the short wires are attached to each of the terminals of the electrical outlet. The outer ends of these wires are attached to the corresponding conductive cylinders by fitting the wires into the outer ends of the proper insulator cylinders. A cover plate may be affixed at the top of the casing, to seal the box.

Preferably the cover plate has two openings for receptacle faces and a screw opening therebetween. The receptacle may be connected to the cover with a screw though that opening before the receptacle wires are pushed into the receivers in the box.

An electrical switch box has a base and side walls extending from the base. A mount is connected to the switch box for mounting the switch box on a structure. Plural conductor plates within the switch box are separated by plural insulator layers. The plates are aligned generally parallel to the base and the top. The conductor plates are spaced inward from the walls. A first set of metal conductors extends from the conductor plates partially toward the walls. A second set of metal conductors extends normally from the conductor plates toward the top of the box. Two sets of connectors having metal conductive cylinders and having outer insulator cylinders extend axially beyond the metal conductors. The metal conductive cylinders have inner and outer ends. The inner ends are permanently attached to the conductors extending from the plates. The insulator cylinders have inner and outer ends. The inner ends of the insulator cylinders extend over the conductors. A first set of the outer ends of the insulator cylinders extend to the side walls of the electrical box. A second set of the outer ends of the insulator cylinders extend through holes in the conductor plates and insulator layers above, toward the top of the box. Multiple holes are arranged in sets of three in the side walls of the switch box and arranged in sets of three in the conductor plates and insulator layers. The outer ends of the conductive cylinders extending to the holes in the walls or to the holes in the conductor plates or insulator layers.

Switches are attached by wires slid into the outward facing terminals. Insulation is removed from both ends of electrical wires. The inner ends of the short wires are attached to each of the terminals of an electrical switch. The outer ends of these wires are attached to the corresponding conductors by fitting the wires into the outer ends of the proper insulator cylinders. A cover plate may be affixed at the top of the casing, to seal the box. Preferably the switch body is pre-attached to the inside of the cover plate, and the rigid short wires from the switch are pushed into the receivers in the box as the cover plate is positioned on the box.

A combination outlet and switch box has a base and side walls extending from the base. A mount is connected to the combination box for mounting the combination box on a structure. Plural conductor plates within the combination box are separated by plural insulator layers. The plates are aligned generally parallel to the base and the top. The conductor plates are spaced inward from the walls. A first set of metal conductors extends from the conductor plates partially toward the walls. A second set of metal conductors extends normally from the conductor plates toward the top of the box. Two sets of connectors having metal conductive cylinders and having outer insulator cylinders extend axially beyond the metal conductors. The metal conductive cylinders have inner and outer ends. The inner ends are permanently attached to the conductors extending from the plates. The insulator cylinders have inner and outer ends. The inner ends of the insulator cylinders extend over the conductors. A first set of the outer ends of the insulator cylinders extend to the side walls of the electrical box. A second set of the outer ends of the insulator cylinders extend through holes in the conductor plates and insulator layers above, toward the top of the box. Multiple holes are arranged in sets of three in the side walls of the combination box and arranged in sets of three in the conductor plates and insulator layers. The outer ends of the conductive cylinders extending to the holes in the walls or to the holes in the conductor plates or insulator layers.

Switches and outlets are attached as above. Insulation is removed from both ends of electrical wires. The inner ends of the wires are attached to each of the terminals of an electrical outlet and an electrical switch. The outer ends of these wires are attached to the corresponding conductors by fitting the wires into the outer ends of the proper insulator cylinders. A cover plate may be affixed at the top of the casing, to seal the box.

Preferably, the insulator cylinders are insulator tubes and the outer ends of the out insulator tubes extended through the walls.

In preferred embodiments, the outer ends of the outer insulator tubes extend to positions flush with outer surfaces of the walls.

Preferred insulator tubes have radially enlarged outer ends with inner diameters sufficient for receiving wire insulation and the inner cylindrical conductive cylindrical connectors having diameters sufficient for receiving copper wires.

Preferably, the inner conductive cylindrical connectors have lanced triangular shark teeth bent inward in the cylinder for engaging the conductor on the plate and the wire which is pushed into the conductive cylinder. The points on the shark teeth penetrate the wire and the conductor and bite into them to prevent outward pulling of a wire once installed. In one embodiment, the shark teeth grippers are permanently or integrally formed on the plates and the shark teeth point inward to grip an inserted wire. Preferably the electrical box cannot be opened and the wire cannot be removed.

Preferably the holes are color-coded, with the central hole in each set being colored green for ground and the outer holes in each set being colored black for common or white for neutral. The black and white match the black and white insulated sleeves on the Romex wires. The green receives the bare or green covered ground wire.

The plates are preferably flat angular metal plates. One set of conductors extends outward from the flat plates. A second set of conductors extends normally outward from the flat plate. The conductors may be welded, brazed or soldered on the plates, or they may be integrally formed with the plates.

In one embodiment, each plate has flat interconnected wire arrangements with wires extending across the box in diverse directions. In that case, the conductors are the ends of the wires.

In one embodiment, the conductors and the cylindrical connectors are formed integrally with the plate. The connectors are formed flat, are lanced to form the shark teeth and are rolled into cylinders.

A preferred junction box has a base, sides connected to the base, plural flat conductor layers mounted in the base and plural insulator layers mounted between the conductor layers. The insulator layers extend to the side walls, and the conductor layers are spaced from the side walls. The conductor layers have conductor tips extending from the conductor layers toward the side walls and terminating short of the side walls. Holes in the side walls are arranged sets of tree and are aligned with the conductor tips. Connectors have inner ends connected to the conductor tips and have outer ends extending to the openings in the side wall for receiving stripped ends of solid copper wire in the outer ends of the connectors.

These and further and other objects and features of the invention are apparent in the disclosure, which includes the above and ongoing written specifications, with the claims and the drawings.

DETAILED DESCRIPTION OF THE PREFERRED EMBODIMENTS

Figure 1:
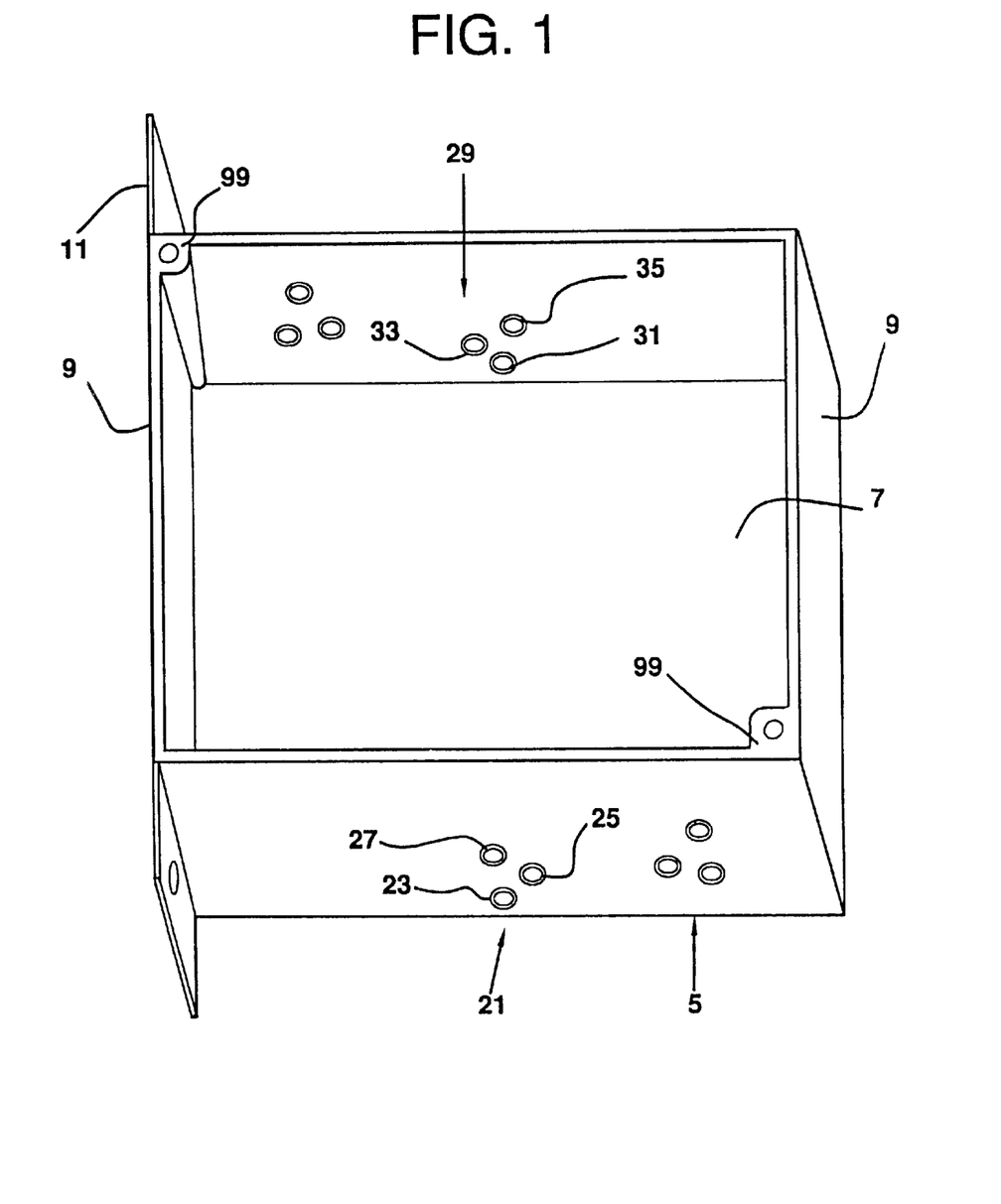
FIG. 1 is a schematic illustration of the casing of the electrical box.

FIG. 1 shows a casing 5 for the present invention. The electrical box includes a casing 5 having connector plates 13 provided therein. The casing 5 may be made of plastic, metal or any other acceptable material and may take any standard shape or size. In preferred embodiments, the casing 5 has a generally rectangular or square cross-section and includes a base 7 and sidewalls 9 extending up from the base 7. Sets 21, 29 of terminal openings 23, 25, 27, 31, 33, 35 for receive terminals and wires extending through openings provided in the walls 9 of the casing 5. Each set preferably includes three terminals, one for receiving a hot wire 23, 31, one for receiving a neutral wire 25, 33, and one for receiving a ground wire 27, 35. The number of terminals in a set may be lesser or greater than three.

In preferred embodiments, the terminals of each set are coded, preferably by color, to ensure proper wire connection. Any number of sets of terminals may be provided. As shown in FIG. 1, the terminals are preferably arranged in sets of three and in a triangular configuration.

Figure 2:
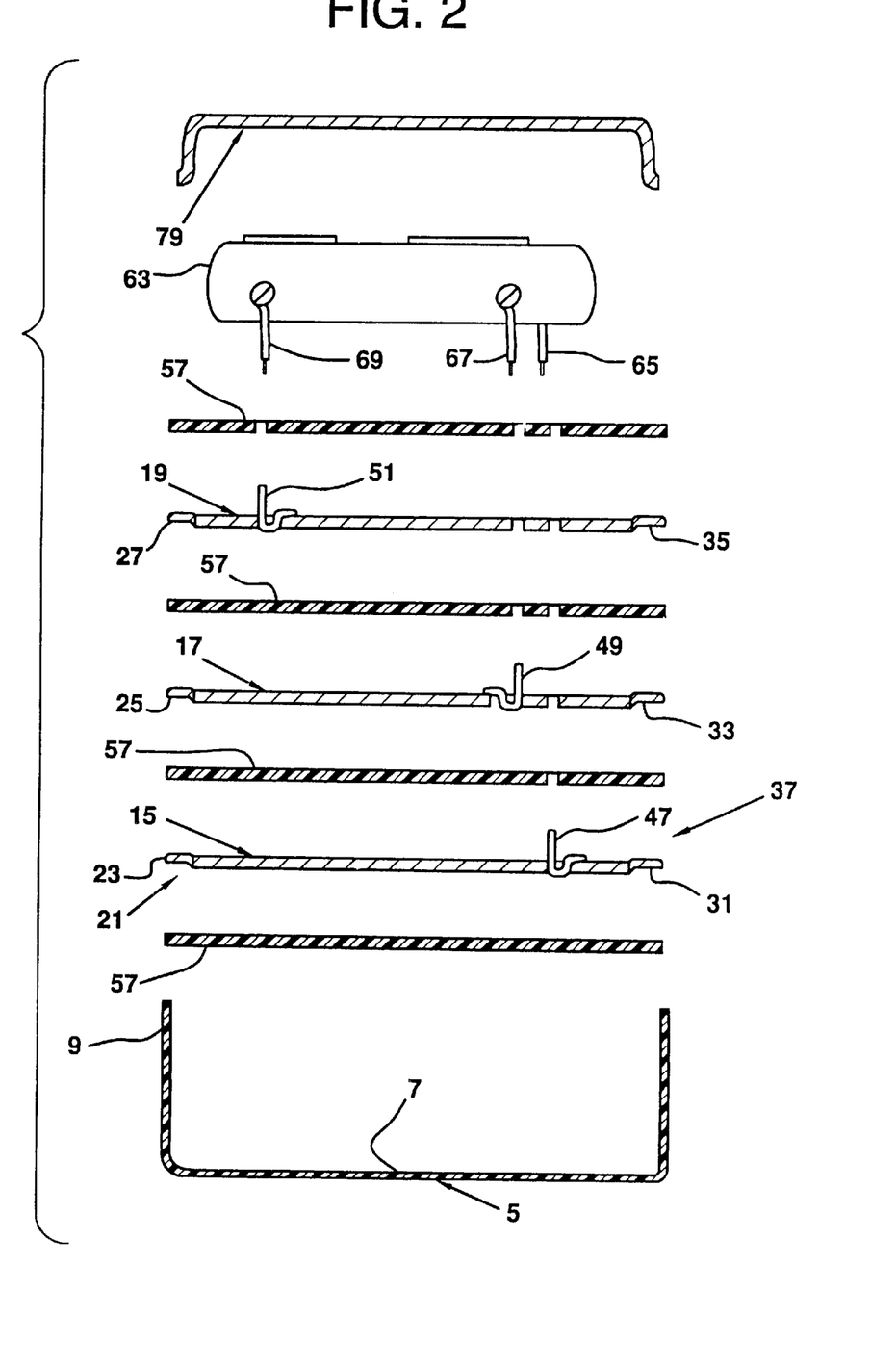
FIG. 2 is an exploded side elevation of the parts of a preferred outlet box.
Figure 3:
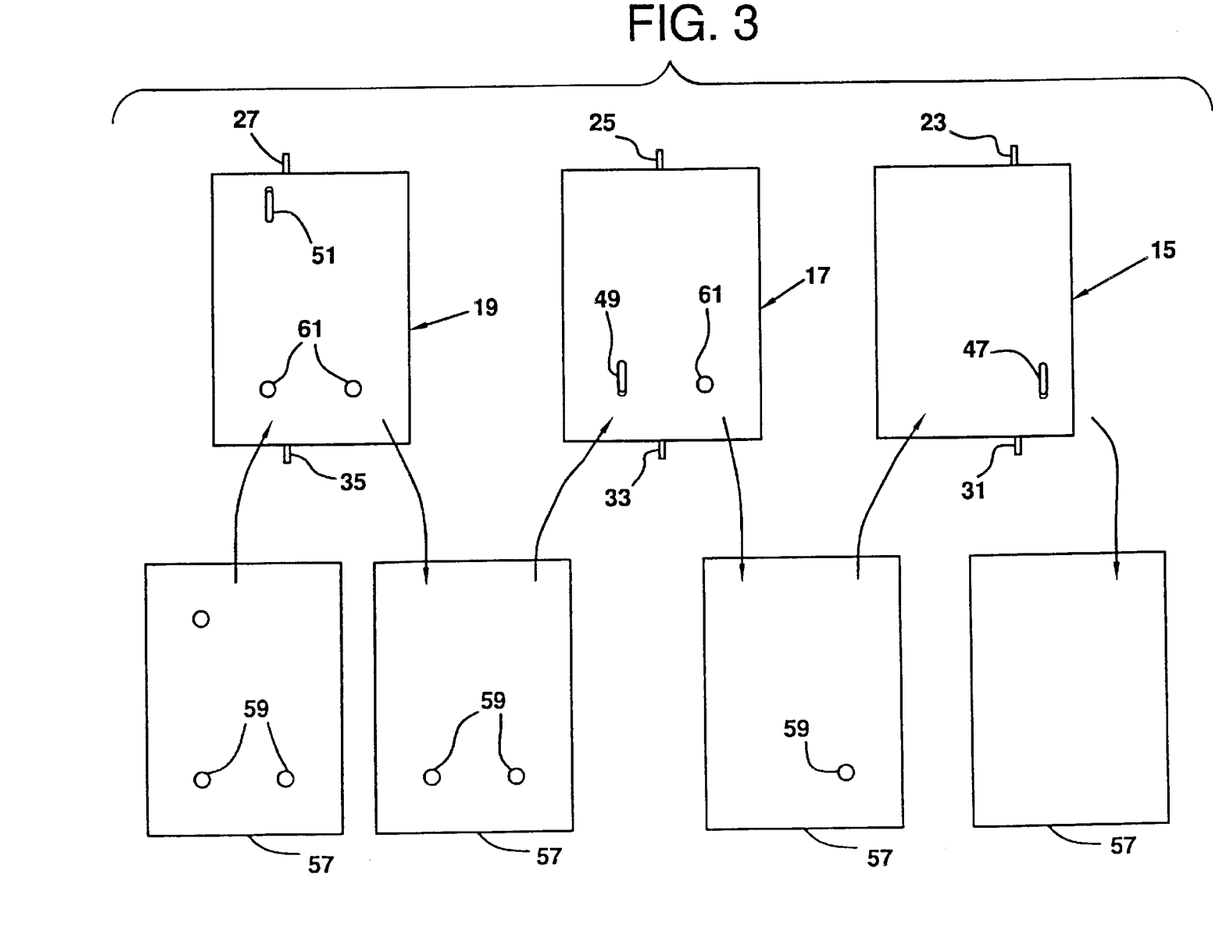
FIG. 3 is a schematic plan view of the preferred connector plates and insulator layers of the outlet box.
Figure 4:
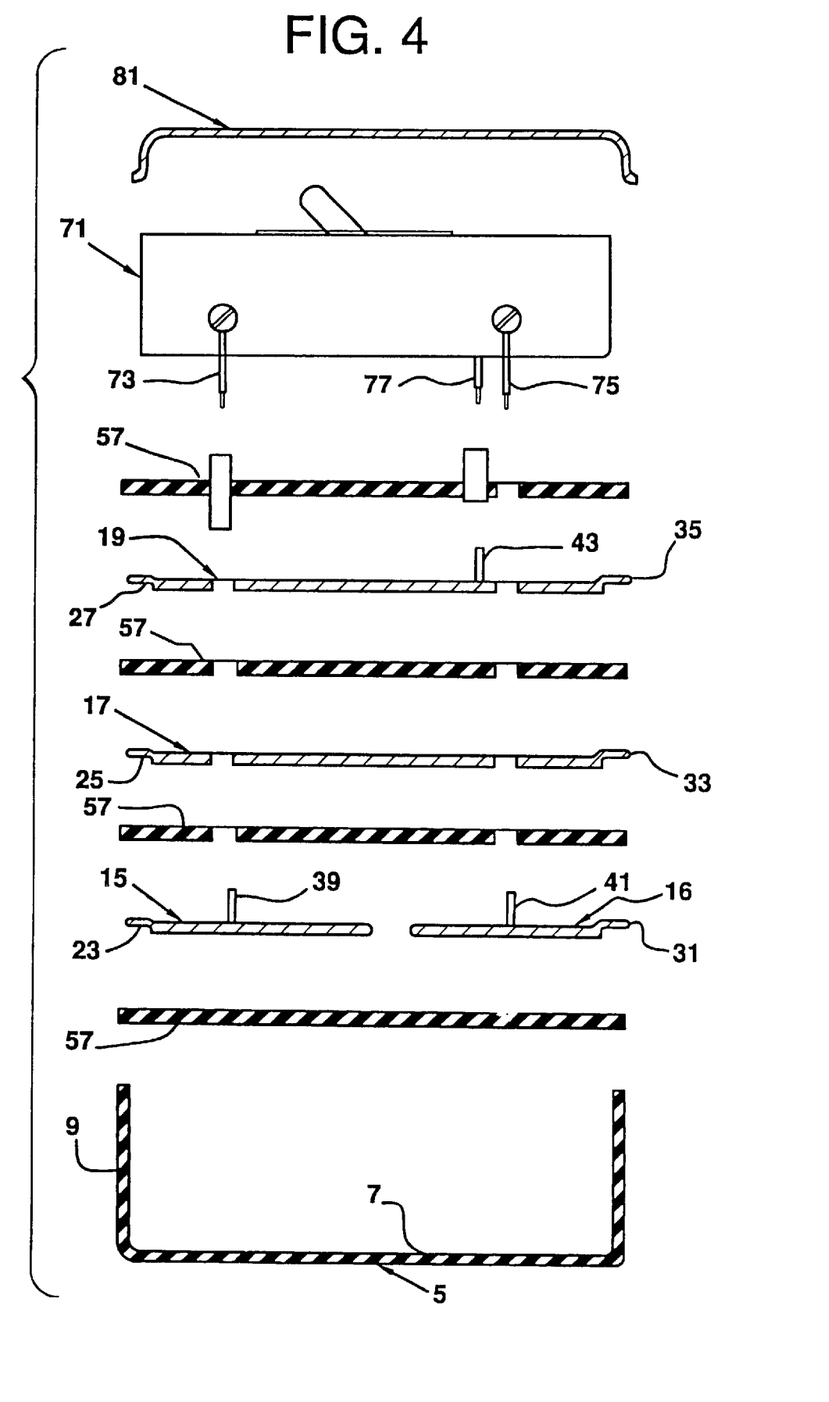
FIG. 4 is an exploded side elevation of the parts of a preferred switch box.

FIGS. 2, 3 and 4 show prefabricated connector plates 13 and insulator layers 57 for use in the present invention. Each connector plate 13 includes an electrical power distribution plate 53. One set 21 of terminals extends from or is connected to sides of the plates. A second set 37 of terminals extends from the plates in the upward or outward direction. Any number of terminals may be provided. The center of the plate 55 may be open and preferably has a shape that is similar or identical to the cross-section of the casing 5. Plates may be replaced by wire grids, in which case ends of the wires form the terminals.

As shown in FIG. 2, in preferred embodiments three of the wire connector plates 13 of FIGS. 2, 3 and 4 are provided in the casing 5 of the present invention. The connector plates 13 are stacked on top of one another with insulating materials 57 provided between the connector plates 13 for electrically insulating the connector plates 13. When the boxes 5 are conductive, two additional insulator layers 57 are added on the outer plates. The connector plates 13 are stacked such that the terminals extending from the edges of the connector plates 13 are arranged in sets, preferably in sets of three and in a triangular configuration. A second set of terminals extend upward or outward from each of the plates. Holes 59, 61 in the insulator layers 57 and connector plates 13 above those terminals allow them to be exposed above the uppermost plate or layer.

Figure 8:
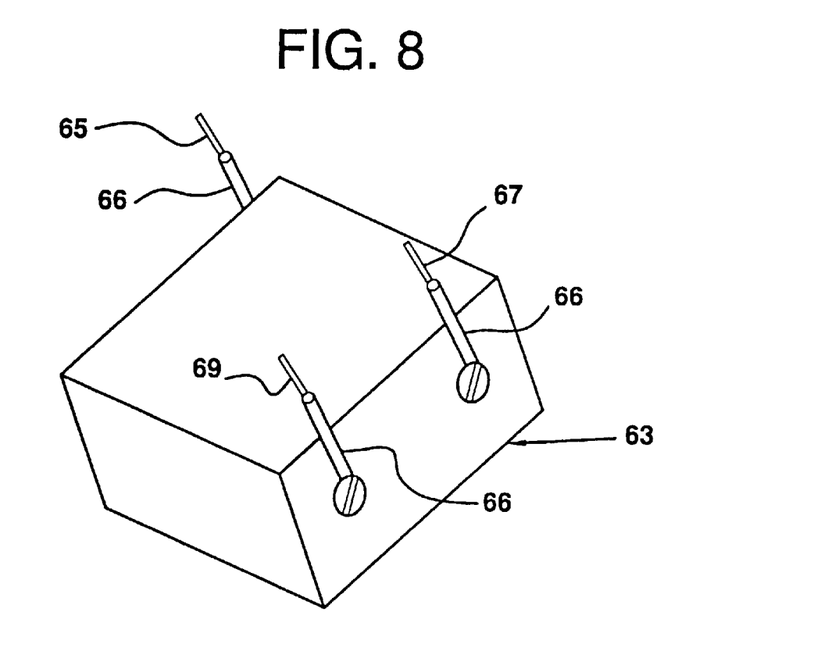
FIG. 8 is a schematic illustration of an outlet used with the present invention.

In preferred embodiments, as shown in FIGS. 2 and 3, an outlet box 1 is created with at least one terminal 47, 49, 51 extending upward from each connector plate 13 and with at least one other terminal extending from each connector plate 13 toward the sidewall 23, 25, 27. The upward terminals are located to allow wires from an electrical outlet 63, as shown in FIG. 8, to slide into the terminals. The sidewall terminals will be connected to electrical line 5. Cover 79 is provided on the box 1.

Figure 5:
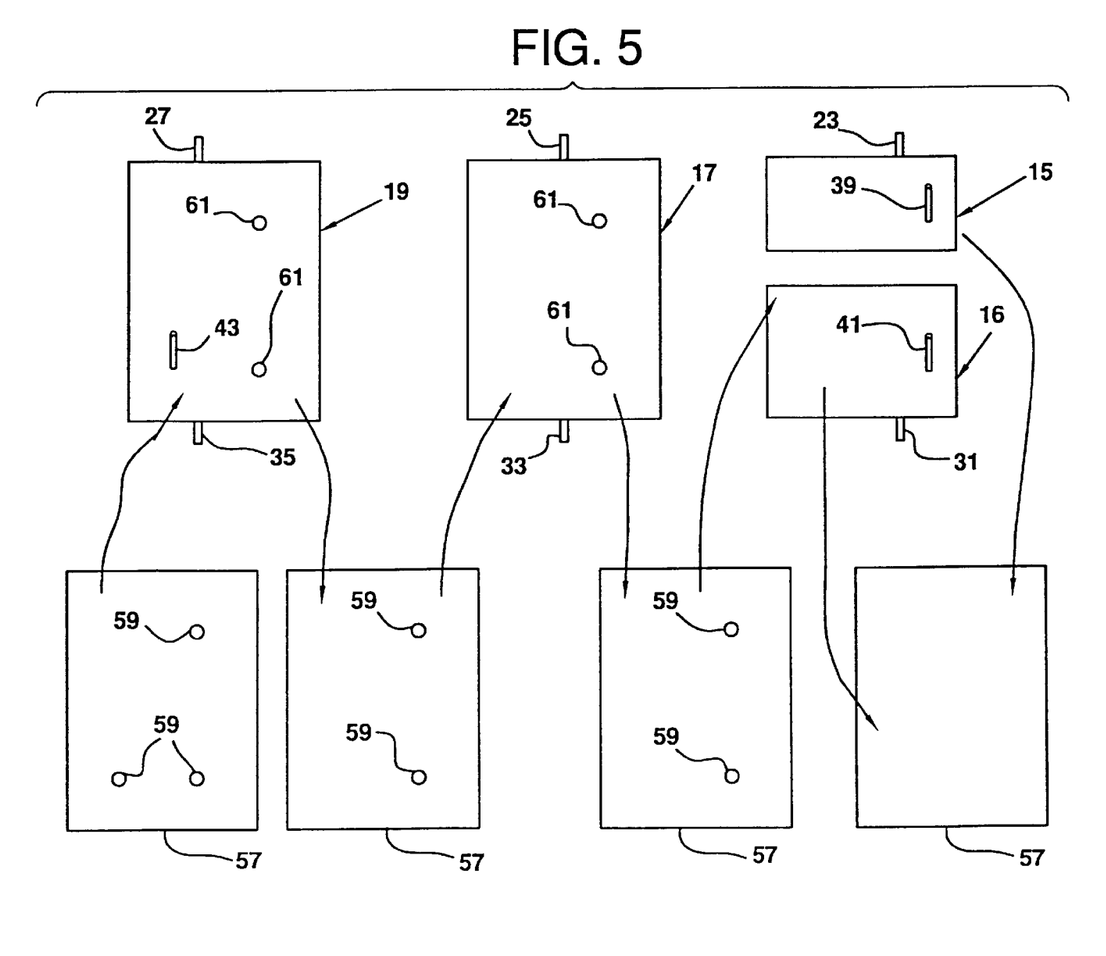
FIG. 5 is a top view of the preferred connector plates and insulator layers of the switch box.

In preferred embodiments, as shown in FIGS. 4 and 5, a switch box 2 is created so that each connector plate 13 has at least one terminal 39, 41, 43 extending upward and at least two terminals extending toward the sidewall. Two hot connector plates are used. One 15 is connected to line and has at least one upward terminal 39 and at least one sidewall terminal 23 connected to the line. The other 16 is connected to load and has at least one upward terminal 41 and at least one sidewall terminal 31 connected to the load. The other connector plates 17, 19 have at least one terminal extending upward 43 and have at least one other terminal 27, 35 extending from each connector plate 13 toward the sidewall. These sidewall terminals are connected to the line. The upward terminals are located to allow wires from an electrical switch 71, as shown in FIG. 9, to slide into the terminals.

Figure 6:
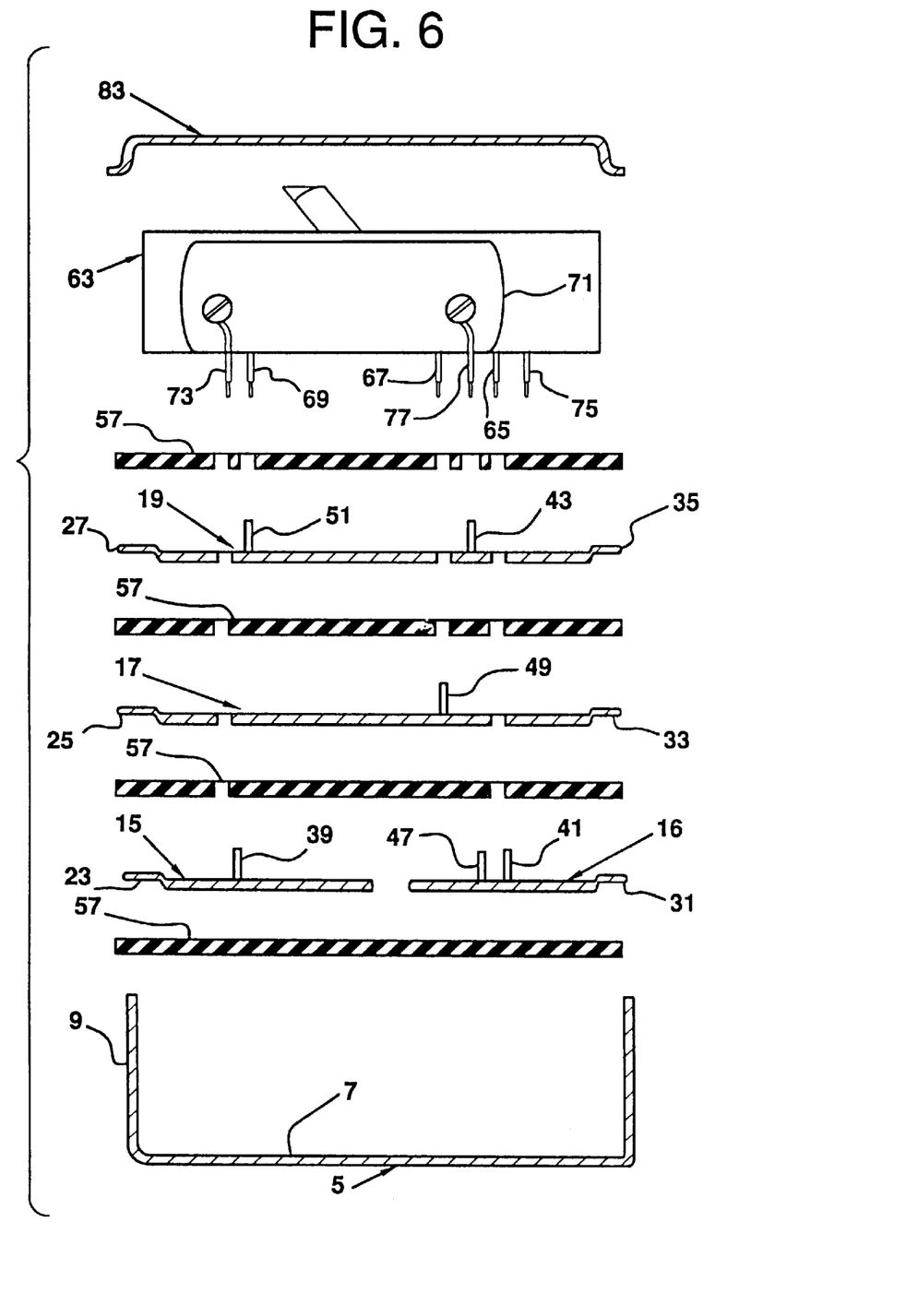
FIG. 6 is an exploded elevational view of the parts of the preferred combination switch and outlet box.
Figure 7:
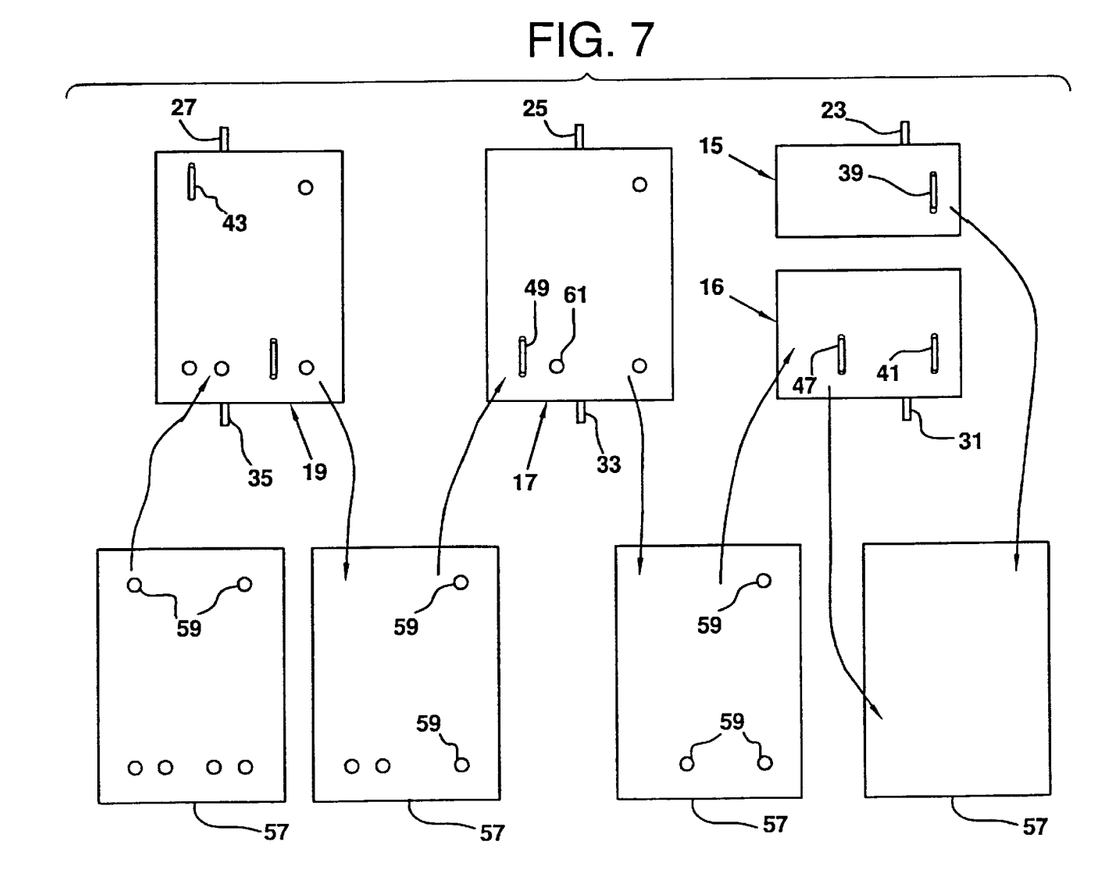
FIG. 7 is a top view (schematic) of the preferred connector plates and insulator layers of the combination outlet and switch box.

In preferred embodiments, as shown in FIGS. 6 and 7, a combination switch and outlet box 3 is created so that each connector plate 13 has upward terminals 39, 41, 43 and sidewall terminals. Two hot connector plates are used. One 15 is connected to line and has at least one upward terminal 39 and at least one sidewall terminal 23 connected to the line. The other 16 is connected to load and has upward terminals 41 and 47 and at least one sidewall terminal 31 connected to the load. The other connector plates 17, 19 have at least one terminal extending upward 49, 43/51 and have at least one other terminal 23, 25, 27, 31, 33, 35 extending from each connector plate 17, 19 toward the sidewall. The upward terminals 37, 45 are located to allow wires from an electrical switch 71 and electrical outlet 63 to slide into the terminals. One of the sidewall terminals is connected to the line and the other is connected to the load.

FIG. 8 depicts an outlet 63 for use with this invention. The outlet 63 has at least three terminals formed by attaching wires 65, 67, 69 at ports located on the outlet. One wire serves as the hot wire 65. A second wire serves as the neutral wire 67. A third wire serves as the ground wire 69. Insulation 66 is stripped from both ends of the wires to allow proper contact.

Figure 9:
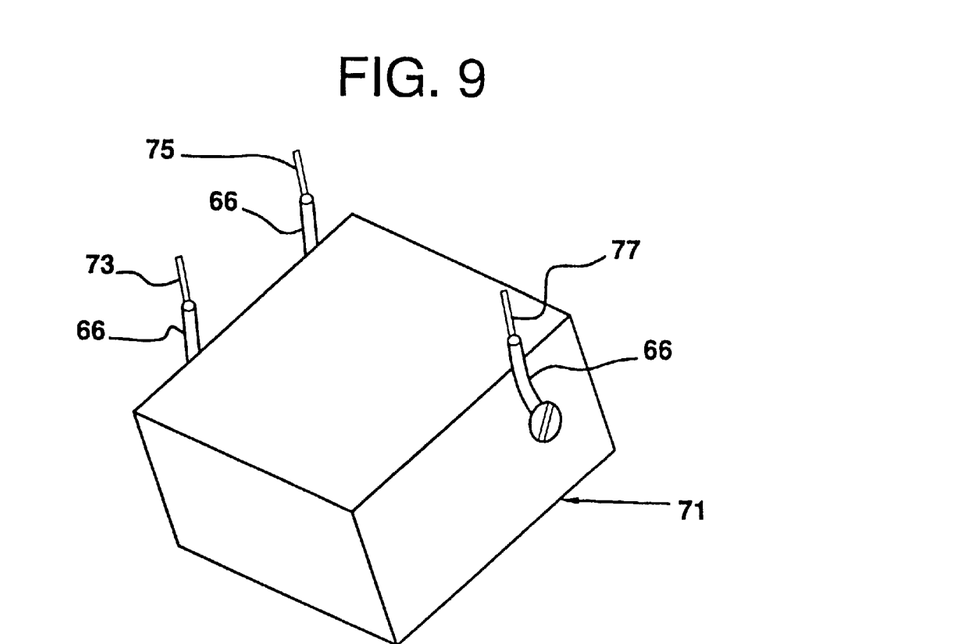
FIG. 9 is a schematic illustration of a switch used with the present invention.

FIG. 9 depicts a switch 71 for use with this invention. The switch 71 has at least three terminals formed by attaching wires at ports located on the switch. One serves as the hot wire to the line 73. One serves as the hot wire to the load 75. One acts as the ground wire 77. Insulation 66 is stripped from both ends of the wire to allow proper contact.

Figure 10:
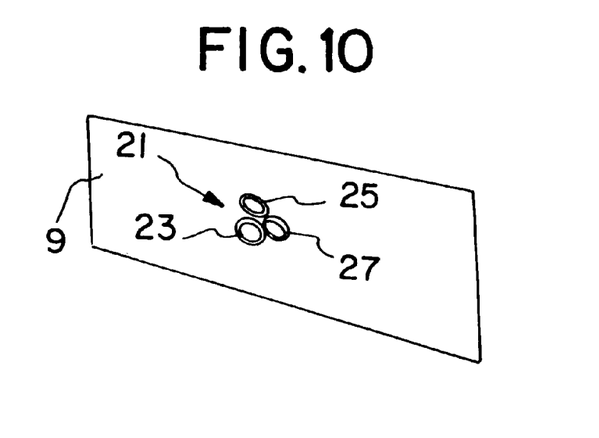
FIG. 10 is a detail of a sidewall of the box of FIG. 1.

FIG. 10 depicts the terminal 85 arrangement on the sidewall 9 of the box. The terminals, preferably are in sets 21 of three 23, 25, 27 and in a triangular configuration.

FIGS. 11A, 11B and 12A–D show preferred embodiments of the terminals. Each terminal 85 includes an inner, clamping part 89 and an outer insulator cover 87. The cover 87 is preferably color coded or otherwise marked for identifying the polarity of the connector plate 13. The inner part 89 includes an inner surface 93 having teeth 91 or other small extensions for gripping and holding a wire.

Figure 11A:
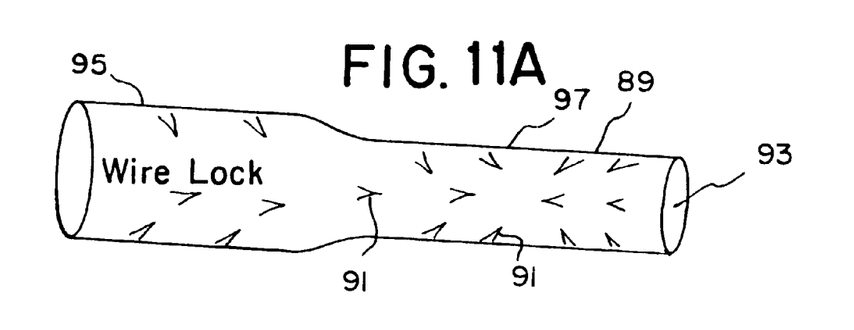
FIG. 11A is a schematic illustration of the inner part of one terminal for use in the present invention.
Figure 11B:
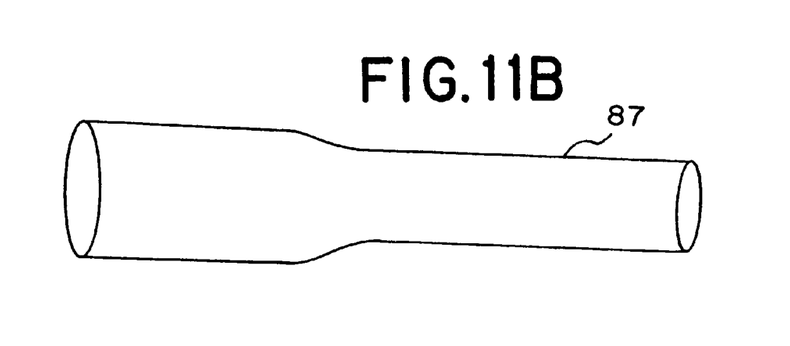
FIG. 11B is a schematic illustration of the outer part of a terminal for use in the present invention.

Each terminal 85 of the electrical box preferably includes an inner clamping part 89 made of copper or nickel, and an outer PVC insulator cover 87. Each terminal 85 has a generally circular cross-section and includes a wide section 95 extending outward to the casing 5 and a narrow section 97 housed within the casing 5. The inner surface 93 of the inner part 89 includes small shark tooth-like extensions 91 with inward extending points for gripping and holding the wire in the terminal 85. The terminals 85 are positions on the plates 13 such that when the plates 13 are stacked, the terminals 85 are arranged in sets, with each set including one terminal 85 from each plate 13.

Figure 12A:
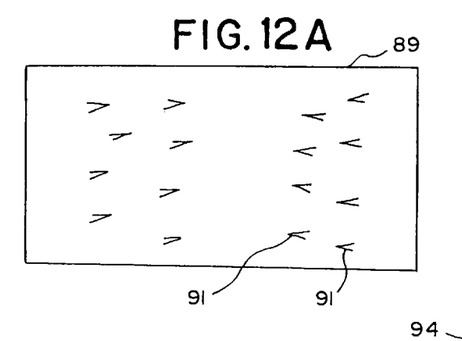
FIGS. 12A–D show a preferred inner part for a terminal in various stages of assembly.
Figure 12B:
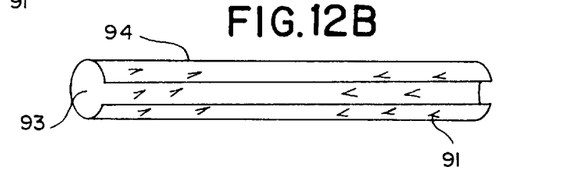
Figure 12C:
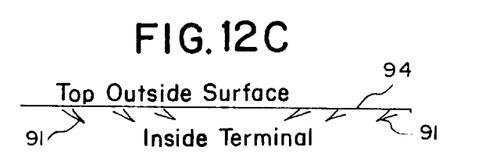
Figures 12D, 13, 14:
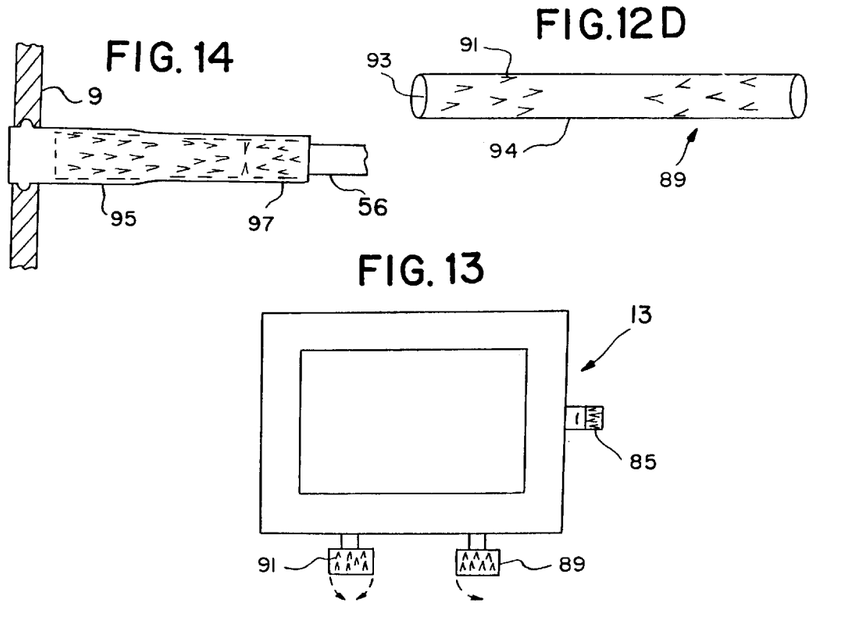
FIG. 13 is a schematic illustration showing cylindrical connectors formed integrally with the plate.
FIG. 14 is a schematic illustration showing a cylindrical connector with stepped outer diameters.

FIG. 13 shows cylindrical connectors 89 formed integrally with the plates 13. The connectors 89 are formed flat, lanced to form shark teeth 91 and are rolled into cylinders. The shark teeth 91 point inward to grip an inserted wire.

FIG. 14 shows a cylindrical connector 89 with stepped outer diameters. The diameter of the cylindrical connector 89 decreases outwardly from the sidewall 9 of the electrical box for receiving and holding wires of various sizes.

Figure 15:
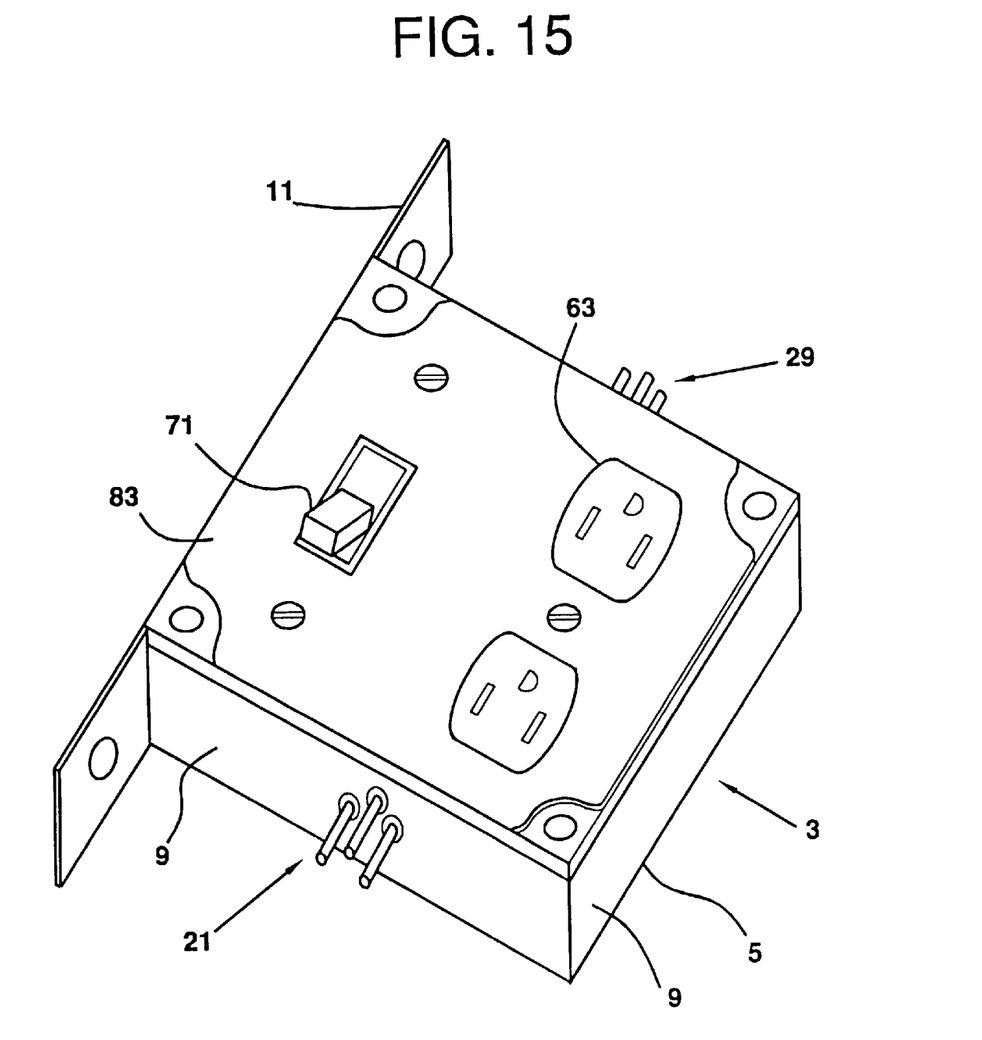
FIG. 15 is a schematic illustration of an assembled combination switch and box according to the present invention.

FIG. 15 shows a combination switch and outlet box 3 according to the present invention. A casing 5 is constructed with sidewalls 9 and a base 7. Metal flanges 11 extend beyond the sidewalls 9 to provide a method to mount the box to a structure. Triangular sets 21, 29 of terminals are located in two of the sidewalls 9. An outlet 63 and a switch 71 are placed above the connector plates 13 and insulator layers 57. A cover plate 83 is placed on top of the outlet 63 and switch 71, and forms the top of the box.

While the invention has been described with reference to specific embodiments, modifications and variations of the invention may be constructed without departing from the scope of the invention, which is defined in the following claims.

I claim:

1. An electrical box apparatus comprising a base, side walls connected to the base, and an open end opposite the base, conductors parallel to the base and insulators between the conductors, connectors extending from the conductors toward the open end, aligned openings in the insulators and conductors for passing the connectors through the openings, conductive receivers on the connectors for receiving wires, and insulating sheaths on the receivers for insulating the wires and the receivers.

2. The apparatus of claim 1, wherein insulating extend into the openings.

3. The apparatus of claim 1, wherein the conductive receivers are conductive cylinders having inward projecting teeth, and wherein the insulating sheaths are insulating cylinders surrounding the conductive cylinders.

4. The apparatus of claim 3, wherein the insulating cylinders have large diameter outer ends for receiving insulation surrounding wires which are received in the conductive cylinders.

5. The apparatus of claim 1, further comprising a switch, short wires having first ends connected to terminals of the switch, and free ends projecting from the switch, the free ends of the short wires being received in the conductive receivers.

6. The apparatus of claim 1, further comprising a switch and a receptacle, short wires having first ends connected to terminals of the switch and the receptacle, and free ends projecting from the switch and the receptacle, the free ends of the short wires being received in the conductive receivers.

7. The apparatus of claim 1, further comprising a receptacle, short wires having first ends connected to terminals of the receptacle, and free ends projecting from the receptacle, the free ends of the short wires being received in the conductive receivers.

8. The apparatus of claim 1, wherein the conductors and insulators are stacked parallel to flat conductive plates and insulator sheets respectively.

9. The apparatus of claim 8, wherein the plates comprise first, second and third plates and the insulation sheets comprise first, second and third insulator sheets above the respective plates, and wherein the second and third plates and the first, second and third sheets have the aligned openings.

10. The apparatus of claim 9, wherein connectors are short wires crimped through the plates.

11. The apparatus of claim 9, wherein are conductive cylinders having first ends welded, brazed or soldered to the plates.

12. The apparatus of claim 1, further comprising a cover for connecting to the side walls at the open end, the cover having openings for receptacles and a switch, and screw receiving holes for mounting a receptacle body and a switch body within the cover, a receptacle body and a switch body mounted inside the cover, and short wires extending from the receptacle body and the switch body into the conductive receivers.

13. The apparatus of claim 1, further comprising a cover for connecting to the side walls at the open end, the cover having openings for receptacles, and screw receiving holes for mounting a receptacle body within the cover, a receptacle body mounted inside the cover, and short wires extending from the receptacle body into the conductive receivers.

14. The apparatus of claim 1, further comprising a cover for connecting to the side walls at the open end, the cover having an opening for a switch, and a screw receiving hole for mounting a switch body within the cover, a switch body mounted inside the cover, and short wires extending from the switch body into the conductive receivers.

* * * * *